United States Patent [19]

Andrew et al.

[11] 4,180,489

[45] Dec. 25, 1979

[54] COATING COMPOSITION

[75] Inventors: Malcolm S. Andrew, Hazlemere; Alan J. Backhouse, South Ascot, both of England

[73] Assignee: Imperial Chemical Industries Limited, London, United Kingdom

[21] Appl. No.: 897,173

[22] Filed: Apr. 17, 1978

[30] Foreign Application Priority Data

Apr. 25, 1977 [GB] United Kingdom ............... 17122/77

[51] Int. Cl.$^2$ ............................................ C08L 91/00
[52] U.S. Cl. ................................ 428/402; 260/22 M; 260/23 P; 260/22 CB; 260/33.6 UA; 260/42.53; 525/78; 525/63; 525/70; 525/88
[58] Field of Search ............. 260/22 CB, 22 M, 23 P, 260/33.6 UA, 42.53, 861, 875, 876 R, 877

[56] References Cited

U.S. PATENT DOCUMENTS

| | | | |
|---|---|---|---|
| 3,264,234 | 8/1966 | Osmond | 260/22 CB |
| 3,382,297 | 5/1968 | Thompson | 260/33.2 R |
| 3,433,753 | 3/1969 | Farkas et al. | 260/22 CB |
| 3,514,500 | 5/1970 | Osmond et al. | 260/874 |
| 3,607,821 | 9/1971 | Clarke et al. | 260/33.6 R |
| 3,652,472 | 3/1972 | Clarke et al. | 260/22 CB |
| 3,661,835 | 5/1972 | Baker et al. | 260/29.1 R |
| 3,686,114 | 8/1972 | Thompson et al. | 260/33.6 UA |
| 3,717,605 | 2/1973 | Osmond et al. | 260/33.6 R |
| 3,812,075 | 5/1974 | Burdett et al. | 260/33.6 R |
| 3,857,810 | 12/1974 | Baker et al. | 260/33.6 R |
| 3,891,572 | 6/1975 | Moody et al. | 424/33 |
| 3,925,295 | 12/1975 | Osborn et al. | 260/33.6 R |
| 3,935,155 | 1/1976 | Osmond et al. | 260/33.6 R |
| 3,948,846 | 4/1976 | Waters | 260/33.6 UA |
| 3,981,839 | 9/1976 | Asher et al. | 260/33.6 R |
| 3,985,700 | 10/1976 | Nicks et al. | 260/33.6 R |
| 4,025,471 | 5/1977 | Takahashi | 260/22 CB |
| 4,059,557 | 11/1977 | Bentley et al. | 260/33.6 UA |
| 4,102,846 | 7/1978 | Bentley et al. | 260/34.2 |

FOREIGN PATENT DOCUMENTS

| | | | |
|---|---|---|---|
| 1052241 | 12/1966 | United Kingdom | 260/22 CB |
| 1156012 | 6/1969 | United Kingdom | 260/22 CB |
| 1242054 | 8/1971 | United Kingdom . | |
| 1319781 | 6/1973 | United Kingdom | 260/22 CB |
| 1451948 | 10/1976 | United Kingdom . | |

*Primary Examiner*—Ronald W. Griffin
*Attorney, Agent, or Firm*—Cushman, Darby & Cushman

[57] ABSTRACT

Coating composition for spray application to a substrate comprising a film-forming polymer, a volatile organic liquid diluent, specified polymer microparticles stably dispersed in the combination of the film-forming polymer and the diluent, and metallic pigmentation also dispersed in the said combination. The composition affords improved control of the orientation of the metallic pigment.

10 Claims, No Drawings

COATING COMPOSITION

This invention relates to the application of protective and decorative coatings to surfaces, particularly the surfaces of automobile bodies.

It is well known to employ for spray application, especially in the automobile industry, coating compositions which contain metallic flake pigments; these are the so-called "glamour metallic" finishes whereby a differential light reflection effect, depending upon the viewing angle, is achieved. To maximise this "flip" tone effect, careful formulation of the coating composition in regard to both the film-forming resin and the liquid medium is required. Difficulties may be encountered in meeting this objective and at the same time achieving a high degree of gloss in the final finish such as is usually desired in the automobile field.

It has now been found that improved control of the orientation of a metallic pigment in a solution-type coating composition, whereby good "flip" effect may be ensured, is obtained when the composition includes, in addition to the main film-forming polymer which is carried in a liquid diluent, a proportion of polymer microparticles of specified type which are insoluble in that diluent.

According to the present invention there is provided a coating composition suitable for spray application to a substrate which comprises (A) a film-forming polymer; (B) a volatile organic liquid diluent in which the polymer (A) is carried; (C) polymer microparticles as hereinafter defined which are insoluble in and stably dispersed in the combination of the polymer (A) and the diluent (B), and (D) metallic pigmentation also dispersed in the combination of polymer (A) and diluent (B).

The film-forming polymer constituent (A) of the composition of the invention may be any of the polymers known to be useful in coating compositions. A particularly useful class of polymer consists of the acrylic addition polymers which are well established for the production of coatings in the automobile industry, that is to say polymers or copolymers of one or more alkyl esters of acrylic acid or methacrylic acid, optionally together with other ethylenically unsaturated monomers such as vinyl acetate, acrylonitrile or styrene. These polymers may be of either the thermoplastic type or the thermosetting, cross-linking type. Suitable acrylic esters for either type of polymer include methyl methacrylate, ethyl methacrylate, propyl methacrylate, butyl methacrylate, ethyl acrylate, butyl acrylate and 2-ethylhexyl acrylate. Where the polymer is required to be of the cross-linking type, suitable functional monomers to be used in addition to the latter include acrylic acid, methacrylic acid, hydroxyethyl methacrylate, 2-hydroxypropyl acrylate, 2-hydroxypropyl methacrylate, N-(alkoxymethyl)acrylamides and N-(alkoxymethyl) methacrylamides, where the alkoxy group may be, for example, a butoxy group, glycidyl acrylate and glycidyl methacrylate. The composition may in such a case contain also a cross-linking agent such as a melamine-formaldehyde resin, and optionally a catalyst for the cross-linking reaction, as discussed in more detail below. Where a cross-linking agent is employed, this is, for the purposes of the present description, considered as being part of the film-forming constituent (A).

According to one embodiment of the invention, the film-forming polymer (A) is in a state of stable dispersion in the diluent liquid (B), which in such a case will be a nonsolvent for the polymer. Methods of preparing such polymer dispersions are well-known in the art and are further referred to below in connection with the production of the polymer microparticles (C).

In another embodiment, the film-forming polymer (A) is dissolved in the diluent (B); the polymer may then be prepared by solution polymerisation of the constituent monomer or monomers, in the presence of suitable catalysts or initiators where necessary. Conveniently the polymerisation may be carried out in the same organic liquid that is to provide the diluent (B), or in a liquid which is to form part of that diluent. Alternatively the polymer (A) may be prepared in a separate previous operation (e.g. by aqueous emulsion polymerisation of monomer) and then dissolved in a suitable organic liquid.

In yet another embodiment, the film-forming polymer (A) may be partly in dispersion and partly in solution in the diluent (B).

Instead of being an acrylic polymer, the polymer constituent (A) of the composition may be an alkyd resin or a polyester.

Such polymers may be prepared in known manner by condensation of polyhydric alcohols and polycarboxylic acids, with or without the inclusion of natural drying oil fatty acids. Suitable polyhydric alcohols include ethylene glycol, propylene glycol, butylene glycol, 1:6-hexylene glycol, neopentyl glycol, diethylene glycol, triethylene glycol, tetraethylene glycol, glycerol, trimethylolpropane, trimethyolethane, pentaerythritol, dipentaerythritol, tripentaerythritol, hexane triol, oligomers of styrene and allyl alcohol (for example that sold by Monsanto Chemical Company under the designation RJ 100) and the condensation products of trimethylolpropane with ethylene oxide or propylene oxide (such as the products known commercially as "Niax" triols). Suitable polycarboxylic acids include succinic acid (or its anhydride), adipic acid, azelaic acid, sebacic acid, maleic acid (or its anhydride), fumaric acid, muconic acid, itaconic acid, phthalic acid (or its anhydride), isophthalic acid, terephthalic acid, trimellitic acid (or its anhydride) and pyromellitic acid (or its anhydride). Where it is desired to produce air-drying alkyd resins, suitable drying oil fatty acids which may be used include those derived from linseed oil, soya bean oil, tall oil, dehydrated castor oil, fish oils or tung oil. Normally it is preferred that the oil length of such an alkyd resin should not exceed 50%. Alternatively, polyester resins not containing any drying oil residues may be subsequently cross-linked with the aid of cross-linking agents similar to those employed with acrylic polymers.

The volatile organic liquid constituent (B) of the composition may be any of the liquids, or mixtures of liquids, which are conventionally used as polymer solvents in coating compositions, for example aromatic hydrocarbons such as toluene and xylene and petroleum fractions of various boiling point ranges having a significant aromatic content, esters such as butyl acetate, ethylene glycol diacetate and 2-ethoxyethyl acetate, ketones such as acetone and methyl isobutyl ketone, and alcohols such as butyl alcohol. The actual liquid or mixture of liquids selected as the diluent (B) will depend upon the nature of the film-forming polymer (A), according to principles which are well known in the coatings art, in order that the polymer shall be soluble or insoluble in the diluent as required.

The polymer microparticles (C) present in the composition of the invention are polymer particles of colloidal dimensions, having a diameter of from 0.01–10 microns, which are insoluble in the combination of the film-forming polymer (A) and the diluent (B) and which are stably dispersed therein (in the sense that they do not undergo flocculation or aggregation) as a consequence of the method of their preparation. This method involves two essential stages: (i) the polymerisation of monomer, from which the microparticles are to be derived, in an inert liquid in which the resulting polymer is insoluble and under conditions such that the polymer is obtained in a state of stable dispersion, and (ii) the subsequent polymerisation, in the same inert liquid and in the presence of the microparticles formed in the first stage, of monomer giving rise to a second polymer which is compatible with the film-forming polymer (A) and soluble in the combination of polymer (A) and diluent (B). The second polymer, which for convenience will be referred to here as the "auxiliary" polymer, may be either soluble or insoluble in the inert liquid in question, depending on the monomer or monomers from which it is derived.

The insolubility of the microparticles in the combination of the film-forming polymer (A) and the diluent (B) may be achieved by suitable selection of the composition of the microparticle polymer, that is to say, the polymer may be one which is inherently insoluble in that combination, but preferably it is achieved by introducing a sufficient degree of cross-linking into a polymer which, if not cross-linked, would actually be soluble in the combination of polymer (A) and diluent (B). Where insolubility of the microparticles is achieved through cross-linking, it is preferred that the degree of cross-linking should not be greater than that necessary to render the polymer insoluble. Insolubility of the microparticles in the combination of polymer (A) and diluent (B) may be checked by means of the following test. The microparticles (1 part by weight) are shaken for 30 minutes with the diluent (B) (100 parts by weight); the suspension is then centrifuged at 17,000 r.p.m. for 30 minutes. The supernatant liquid is decanted off and the residual polymer then dried for 30 minutes at 150° C., after which its weight is compared with that of the microparticles originally taken. This test may be difficult to apply where the specific gravity of the diluent is close to or greater than that of the microparticles, but such diluents (e.g. chlorinated solvents) would not normally be used in the compositions under consideration. Where the result of this test indicates that the microparticles are acceptably insoluble in the diluent (B) alone, it can be assumed that the particles will be at least equally insoluble when the polymer (A) is also present in solution in the diluent; there would be practical difficulties in carrying out the test actually in the solution of polymer (A) in diluent (B). Where the polymer (A) is in a state of dispersion in the diluent (B), its presence will not normally have any influence on the degree of insolubility of the microparticles.

The microparticulate polymer may be of various types. It may, for example, be an acrylic addition polymer, derived from one or more of the same monomers as have been described above in connection with the film-forming polymer constituent (A). Where it is desired that such a polymer should be crosslinked, this may be achieved by either of two general methods: firstly, by including in the monomers from which the polymer is derived a minor proportion of a monomer which is polyfunctional with respect to the polymerisation reaction, e.g. ethylene glycol dimethylacrylate or divinylbenzene; or secondly, by including in those monomers minor porportions of two other monomers carrying pairs of chemical groupings which can be caused to react with one another either during or after the polymerisation reaction, such as epoxy and carboxyl (e.g. glycidyl methacrylate and methacrylic acid), anhydride and hydroxyl or isocyanate and hydroxyl. Alternatively, the microparticles may be composed of a condensation polymer, for example a polyester prepared from any of the polyhydric alcohols and polycarboxylic acids described above. Again, such polymers may be cross-linked if desired, by the incorporation of materials of functionality greater than two, in the starting composition, although in this case, because of the characteristically broad distribution of molecular species formed in a condensation polymerisation, it may be difficult to ensure that all those species are in fact cross-linked.

The chemical compositions and degree of cross-linking of the microparticulate polymer may be such that it has a Tg (glass-rubber transition temperature) below room temperature, in which case the microparticles will be rubbery in nature; alternatively it may be such that the Tg is above room temperature, that is to say the particles will be hard and glassy.

As already stated, it is necessary that the polymer microparticles be stably dispersed in the combination of the film-forming polymer (A) and the liquid diluent (B). By "stably dispersed" is meant that the particles are prevented from flocculating or aggregating by means of a steric barrier around the particles, of polymer chains which are solvated by the said combination and hence are in a chain-extended configuration. In this context the term "solvated" implies that the polymer chains in question, if they were independent molecules, would be actually soluble in the combination of the polymer (A) and the diluent (B); however, because the chains are in fact attached to the microparticles at one or more points along their length, the steric barrier remains permanently attached to the particles. It will be understood that the stabilising polymer chains to be used in any particular instance will be selected with reference to the nature of the liquid diluent and film-forming polymer concerned. In general terms this means that the chains will be of a degree of polarity similar to that of the diluent and film-forming resin, so that the combination of the latter will be inherently a solvent for the polymer of which the chains are composed. Since, in the automobile finishes to which the present invention is primarily directed, the liquid diluent will conventionally be of a relatively high degree of polarity (containing, for example, a substantial proportion of "strong" ester and ketone solvents) if follows that the stabilising chains on the microparticles will usually require to be of a composition such that they are inherently soluble in that type of liquid.

The mode of anchoring of the stabilising chains to the microparticles is conveniently discussed in connection with methods of making the particles, as follows.

The polymer microparticles may be produced in various ways. Preferably they are produced by a process of dispersion polymerisation of monomers, in an organic liquid in which the resulting polymer is insoluble, in the presence of an amphipathic steric stabilising agent. Suitable processes of dispersion polymerisation are well known and extensively described in the literature. Thus, so far as the dispersion polymerisation of ethylenically unsaturated monomers such as acrylic or methacrylic acid esters, vinyl esters and styrene or its derivatives is concerned, the procedure is basically one of polymerising the monomers in an inert liquid in which the monomers are soluble but the resulting polymer is not soluble, in the presence dissolved in the liquid of an amphipathic stabilising agent or of a polymeric precursor which, by copolymerisation or grafting with a portion of the monomers, can give rise in situ to such a stabilising agent. Reference may be made, for example, to British Patent Specifications Nos. 941,305; 1,052,241; 1,122,397 and 1,231,614 for a general description of the principles involved, as well as to "Dispersion Polymerisation in Organic Media", ed. K. E. J. Barrett (John Wiley and Sons, 1975). Suitable ethylenically unsaturated monomers include methyl methacrylate, ethyl methacrylate, butyl methacrylate, ethyl acrylate, butyl acrylate, 2-hydroxyethyl acrylate, vinyl acetate, vinyl propionate, styrene and vinyl toluene. The production specifically of dispersions of cross-linked addition polymer particles can be achieved by including, in the monomers selected, pairs of monomers containing (in addition to the polymerisable unsaturated groups) groups capable of entering into chemical reaction with each other; for example, the epoxide and carboxyl groups contained in glycidyl methacrylate and methacrylic acid. By following the procedures particularly described in British Patent Specifications Nos. 1,095,288 and 1,156,012, for example, particles are obtained in which there are present such complementary groups which, although not at that stage coreacted, can be caused to coreact and so form cross-links by subsequently heating the dispersion to a suitably elevated temperature. Cross-linked addition polymers may also be prepared in dispersion by including in the monomers undergoing dispersion polymerisation a minor proportion of a monomer which is difunctional with respect to the polymerisation reaction, such as ethyleneglycol dimethacrylate or divinylbenzene.

Of the unsaturated monomers mentioned above, methyl methacrylate is an appropriate choice where it is desired that the polymer microparticles should have a high Tg value. Where the microparticles are required to be of low Tg, ethyl acrylate or vinyl acetate may be used, but it may be a more convenient alternative to copolymerise methyl methacrylate with minor proportions of "softening" monomers such as butyl acrylate or butyl methacrylate. The proportions used of such softening monomers may, however, need to be limited; otherwise there is a risk that the resulting copolymer may be too soluble, even in low-polarity hydrocarbon diluents, for a stable dispersion of microparticles to be obtained. With butyl acrylate as the softening monomer, for example, a proportion of 15% by weight of the total monomers should not be exceeded. Certain other softening monomers such as 2-ethoxyethyl acrylate or 2-ethoxyethyl methacrylate, may be used in greater proportions than this if desired, but these monomers are not as readily accessible as the corresponding lower alkyl esters. Small proportions of comonomers incorporating carboxyl groups, e.g acrylic acid or methacrylic acid may be included (where the microparticles are to be cross-linked, such proportions would be in excess of those used in order to achieve cross-linking by reaction with a coreactive monomer such as glycidyl methacrylate). Conversely, small (additional) proportions of an epoxide monomer, e.g. glycidyl methacrylate, may be included. Other functional monomers, such as hydroxyethyl acrylate or acrylamide, may also be included in minor proportions in the monomers from which the microparticles are to be derived.

The production of dispersions of condensation polymers is described, for example, in British Patent Specifications Nos. 1,373,531; 1,403,794 and 1,419,199, and methods of obtaining cross-linked polymer particles are included in these descriptions. The general principles involved here are the same as those referred to above in connection with addition polymer dispersions, but there is a difference of detail arising from the commonly more highly polar nature of the monomers or starting materials from which condensation polymers are derived. This is, namely, that the monomers in question are usually insoluble in the inert liquid in which the polymerisation is to be carried out. Accordingly the first step in the dispersion polymerisation of the monomers is to bring them into a state of colloidal dispersion in the inert liquid, either as liquid or as solid particles. In the second step, polymerisation of the monomers takes place within those same particles. An amphipathic stabilising agent is required in each stage, firstly in order to stabilise the particles of monomer and secondly in order to stabilise the particles of polymer formed, but in suitable cases a single stabilising agent can be found which will perform both these functions. In place of using a preformed amphipathic stabilising agent in this process, there may be employed instead a suitable polymeric precursor which, by copolymerisation or grafting with a portion of the monomers being polymerised, can give rise to such a stabilising agent in situ. Reference may be made in this connection to U.S. Pat. No. of Bentley Ser. No. 795,307 filed May 9, 1977.

Suitable monomeric starting materials for preparing condensation polymer microparticles are those which are well known for use in making such polymers by melt or solution polymerisation techniques. For example, suitable materials in the case of polyester microparticles are the polyhydric alcohols and polycarboxylic acids mentioned above in connection with the film-forming polymer (A). In the case of polyamide microparticles, suitable monomeric starting materials are amino-acids, such as 6-aminocaproic acid or 11-aminoundecanoic acid, or the corresponding lactams, and/or polyamines, such as ethylene diamine, propylene diamine, hexamethylene diamine, diethylene triamine, triethylene tetramine or tris(aminomethyl) methane, in conjunction with the polycarboxylic acids mentioned above. It will, of course, be understood that, in the case of both polyester and polyamide microparticles, the mixture to be polymerised must incorporate some proportion of a starting monomer which has a functionality greater than two, where it is desired that the microparticles should be cross-linked.

In all the above-described dispersion polymerisation processes, the amphipathic steric stabilising agent is a substance the molecule of which contains a polymeric component which is solvatable by the liquid in which the dispersion is made and another component which is relatively non-solvatable by that liquid and is capable of associating with the polymer particles produced. Such a stabilising agent will be soluble as a whole in the dispersion liquid, but the resulting solution will usually contain both individual molecules and micellar aggregates of molecules, in equilibrium with each other. The type of stabilising agent preferred for use in the invention is a block or graft copolymer containing two types of polymeric component: one type consists, as stated above, of polymer chains which are solvatable by the dispersion liquid and the other type consists of polymer chains of different polarity from the first type which accordingly are not solvatable by that liquid and are capable of becoming anchored to the polymer microparticles. A particularly useful form of such a stabilising agent is a graft copolymer comprising a polymer backbone, which is the non-solvatable or "anchor" component, and a plurality of solvatable polymer chains pendant from the backbone. Specific examples of such graft copolymers include those in which the backbone is an acrylic polymer chain, derived predominantly from methyl methacrylate, and the pendant chains are residues of poly(12-hydroxystearic acid) which are readily solvatable by an aliphatic hydrocarbon medium. These copolymers may be made, for example, by first reacting poly(12-hydroxystearic acid) with glycidyl acrylate or glycidyl methacrylate, whereby the terminal—COOH group in the polymeric acid is converted to an ester derivative containing a polymerisable unsaturated grouping, and then copolymerising that derivative with methyl methacrylate, optionally together with minor proportions of other copolymerisable monomers. By employing acrylic acid or methacrylic acid as such minor comonomers, it is possible to introduce carboxyl groups into the backbone chain of the graft copolymer with beneficial results inasmuch as the backbone is thereby rendered more polar than it is if composed of methyl methacrylate units alone. This increased polarity causes the backbone to be even less solvatable by a non-polar diluent such as an aliphatic hydrocarbon, and in consequence enhances the force whereby it becomes anchored to the microparticle.

The foregoing patent and literature references, and the foregoing description, relating to dispersion polymerisation processes suitable for the production of the polymer microparticles are equally applicable to the production of the film-forming polymer (A), where this is to be in a state of stable dispersion in the diluent (B), except that the polymer (A) will not normally be cross-linked at this stage even though it may become cross-linked as the result of a curing operation following application of the composition to a substrate.

After formation of the polymer microparticles in dispersion in the manner just described, the auxiliary polymer is then formed by further polymerisation of monomer in the presence of the microparticles. This further polymerisation is accomplished simply by feeding in an additional charge of monomer to the same reaction mixture in which the microparticles have been produced under essentially the same conditions as were operated in the first stage, but with the differences that the monomer or monomers involved will overall be of a different composition to those used in the first stage and that the auxiliary polymer, unlike the microparticles, will not necessarily be wholly insoluble in the inert liquid in which the polymerisation is carried out.

In general, the auxiliary polymer will be required to have a composition such that it is compatible with the film-forming polymer (a); indeed, it may be identical with that polymer and, in certain circumstances as described below, even wholly replace it. The monomer or monomers from which the auxiliary polymer is to be derived will be chosen with this requirement in mind, from the range of monomers already described in connection with the production of the polymer (A) or other suitable monomers, as will be apparent to those skilled in the art.

On introducing the microparticles, associated with auxiliary polymer in the way described above, into the dispersion or solution of the polymer (A) in the diluent (B), part of the auxiliary polymer may be dissolved away by that more polar medium, but it is believed that a substantial proportion of the auxiliary polymer chains remain attached to the microparticles (albeit now solvated by the medium), for example by virtue of their having become entangled with the chains of the microparticle polymer during their formation, or as a result of actual grafting on to those chains. Whatever the mechanism may be, the effect of the presence of the auxiliary polymer is to stabilise the microparticles in the new, more polar environment. If desired, this stability may be enhanced by ensuring that covalent linkages are developed between the chains of the auxiliary polymer and those of the microparticles. This may be done, for example, by including an unsaturated carboxylic acid in the monomers from which the auxiliary polymer is derived. The carboxyl groups so introduced are able to react with epoxide groups, present in the microparticle polymer as the result of the use of a slight excess of the latter groups for the purpose of cross-linking that polymer by reaction with carboxyl groups in the manner described above. The incorporation of the microparticles, associated with auxiliary polymer, into the composition of the invention may be achieved either by blending the dispersion obtained after formation of the auxiliary polymer directly with the dispersion or solution of the film-forming polymer (A) in the diluent (B), or, in the extreme case, by simply adding to the microparticle dispersion sufficient strong solvent to dissolve away enough of the auxiliary polymer from the microparticles to provide itself the whole of the film-forming polymer constituent (A), whilst still leaving a residue of the auxiliary polymer associated with the microparticles which will ensure their continued stabilisation. Another possibility is to separate the microparticles from the dispersion in which they are made, for example by centrifuging, filtration or spray-drying, and then to blend the microparticles with the dispersion or solution of the film-forming polymer (A).

It follows from the foregoing description that, for the purposes of the definition of the invention hereinbefore given, the film-forming constituent (A) is always to be considered to comprise that part of the auxiliary polymer which is dissolved away from the microparticles when the latter are incorporated into the base-coat composition.

As an alternative to the use in organic media of dispersion polymerisation methods, the polymer microparticles may, for example, be produced by aqueous emulsion polymerisation of suitable unsaturated monomers, using procedures well known in the art. The microparticles are then obtained in the form of a charge-stabilised dispersion, from which the particles themselves can be separated, e.g. by spray drying. For incorporation into the coating composition, the microparticles are then re-dispersed in the solution or dispersion in the diluent of the film-forming polymer, preferably by methods imparting high shear to the mixture such as pug milling or triple roll milling, in an analogous fashion to the dispersion of a pigment. By further analogy to pigment dispersion, the requisite steric stability of the microparticles may then be achieved simply as a result of an innate tendency of the film-forming polymer (especially where it is soluble in, and therefore solvated by, the diluent) to associate with the particles, for example through the interaction of polar groups present in the film-forming polymer and in the microparticle respectively. In producing the microparticles by aqueous emulsion polymerisation, some difunctional unsaturated compounds may be included in the polymerising monomers in order to give rise to a cross-linked polymer which will be insoluble in the solution of the film-forming polymer (A) in the diluent (B), whatever the nature of the latter. Here again, as in the case of microparticles made by dispersion polymerisation in organic media, it is essential to continue the emulsion polymerisation with a second feed of monomers which does not include any difunctional (i.e. cross-linking) material and which gives rise to a polymer which is compatible with the polymer (A) and is soluble in the solution or dispersion of polymer (A) in diluent (B), in other words to associate with the microparticles an auxiliary polymer having the same function as that previously described.

The polymer microparticles (C) used in the composition of the invention are preferably present in proportions of from 2% to 30% of the aggregate weight of the film-forming polymer (A) and the microparticles. More preferably, the proportion of microparticles is from 5% to 20% of that aggregate weight. The precise proportion which is used will depend upon the particular application properties which it is desired that the coating composition should possess, especially the degree of control over the orientation of the metallic pigment. For the purposes of this definition, it is to be understood that the term "polymer microparticles" refers to the microparticles proper together with that part of the auxiliary polymer which cannot be dissolved away from the particles by the diluent (B), under the conditions of the insolubility test described above.

The metallic pigmentation (D) employed in the compositions of the invention can be flat flakes of any suitable metal, including, for example, copper, tin, nickel or stainless steel. However, the metal which is of particular interest in this context is aluminium. The metallic pigment may be present in a proportion of from 1% to 10% of the aggregate weight of the film-forming material (A) and the microparticles (C). Such metallic pigments may be incorporated into the compositions with the aid of known dispersants, for example an acrylic film-forming polymer similar in composition to the main film-forming polymer constituent (A), when the latter is of the acrylic type. Such a polymeric dispersant will also be considered as being part of the constituent (A), for the purposes of the foregoing definition of the invention.

If desired, the compositions may additionally incorporate other known additives, for example viscosity modifiers such as bentone or cellulose acetate butyrate.

In the case where the film-forming polymer (A) is of the thermosetting or cross-linking type, there may, as already stated, be incorporated in the composition of the invention a cross-linking agent. Known types of cross-linking agents include diisocyanates, diepoxides and, especially, aminoplast resins, that is to say condensates of formaldehyde with nitrogenous compounds such as urea, melamine or thiourea, or the lower alkyl ethers of such condensates in which the alkyl group contains from 1 to 4 carbon atoms. Particularly suitable are melamine-formaldehyde condensates in which a substantial proportion of the methylol groups are etherified by reaction with butanol. The proportion of cross-linking agent to cross-linkable acrylic or other polymer in the composition may vary widely, but in general a ratio of from 50:50 to 90:10 by weight of polymer to cross-linking agent is satisfactory. The precise proportion to be employed depends upon the properties required in the final film, but a preferred range affording a good balance of properties is from 60:40 to 85:15 by weight of polymer to cross-linking agent. Where it is of particular importance that the film should exhibit good resistance towards acid corrosion induced by severe atmospheric pollution, an especially preferred range of ratios of polymer to cross-linking agent is from 70:30 to 85:15 by weight.

The composition may also incorporate a suitable catalyst for the cross-linking reaction, for example an acid-reacting compound such as acid butyl maleate, acid butyl phosphate or p-toluene sulphonic acid. Alternatively, the film-forming polymer of the composition may be arranged to contain free acid groups, as for example by the incorporation in an acrylic polymer of units derived from acrylic or methacrylic acids.

According to another aspect of the present invention there is provided a process for the production of a surface coating upon a substrate which comprises applying by spray to the substrate surface a composition as hereinbefore defined and subsequently evaporating the volatile liquid diluent. In the case where the film-forming polymer (A) is of the thermoplastic type, volatilisation may be allowed to occur at room temperature or the coating may be subjected to an elevated temperature, for example of up to 160° C. Where the polymer (A) is of the thermosetting type, it will normally be necessary to subject the coating to treatment at an elevated temperature, e.g. 80° C. to 140° C., in order to bring about the cross-linking of the polymer, with the assistance of the cross-linking agent if also present.

The compositions of the invention may be applied to a substrate by any of the known spraying procedures, such as compressed air spraying, electrostatic spraying, hot spraying and airless spraying, and either manual or automatic methods are suitable. By these procedures, films of up to 4 mils dry thickness may be applied without any tendency for sagging or "sheariness" of the metallic pigment to occur.

The invention is illustrated but not limited by the following Examples, in which parts and percentages are by weight:

EXAMPLE 1

(a) Preparation of Polymer Microparticles

To a vessel fitted with stirrer, thermometer, reflux condenser and provision for adding a liquid feed to the returning condensate was charged:

| | |
|---|---|
| Aliphatic hydrocarbon (boiling range 170°–210° C.; aromatic content 5%) | 15.880 parts |
| Hexane | 3.890 parts |
| Heptane | 20.802 parts |
| Methyl methacrylate | 2.364 parts |
| Azodiisobutyronitrile | 0.187 part |
| Graft copolymer stabiliser (33% solution: as described below) | 0.881 part |

The vessel and contents were purged with inert gas; the temperature of the reactants was raised to 100° C. and held there under reflux for 1 hour. The following ingredients were pre-mixed and fed into the hydrocarbon returning from the condenser at a uniform rate over a period of 6 hours:

| Methyl methacrylate | 44.918 parts |
| Methacrylic acid | 0.458 part |
| Glycidyl methacrylate | 0.458 part |
| Azodiisobutyronitrile | 0.602 part |
| Graft copolymer stabiliser solution (as described below) | 9.453 parts |

There was additionally included, in the last hour of the feed procedure, 0.033 part of triethylene diamine. After completion of the feed, the reaction mixture was maintained under reflux for 3 hours, when a fine dispersion of insoluble gel microparticles was obtained. The total solids content of the dispersion was 52%; the content of insoluble microparticles was 31.2%.

The graft copolymer stabiliser used in the above procedure was obtained as follows. 12-Hydroxystearic acid was self-condensed to an acid value of about 31–34 mg KOH/g (corresponding to a molecular weight of 1650–1800) and then reacted with an equivalent amount of glycidyl methacrylate. The resulting unsaturated ester was copolymerised at a weight ratio of 2:1 with a mixture of methyl methacrylate and acrylic acid in the proportions of 95:5.

(b) Modification of Microparticles with Auxiliary Polymer

To a vessel fitted as described in step (a) there was charged:

| Microparticle dispersion obtained in step (a) | 47.471 parts |
| Aliphatic hydrocarbon (boiling range 115°–145° C.) | 16.382 parts |

This charge was heated to recycling temperature (115° C.) in an inert gas atmosphere. The following ingredients were pre-mixed and fed at a constant rate over a period of 3 hours to the hydrocarbon returning from the condenser:

| Methyl methacrylate | 3.342 parts |
| Hydroxyethyl acrylate | 1.906 parts |
| Methacrylic acid | 0.496 part |
| Butyl methacrylate | 3.691 parts |
| 2-Ethylhexyl acrylate | 3.812 parts |
| Styrene | 5.712 parts |
| tert-Butyl perbenzoate | 0.906 part |
| prim-Octyl mercaptan | 0.847 part |
| Graft copolymer stabiliser solution (as described in step (a)) | 1.495 parts |

On completion of the feed, the reaction mixture was held at recycle temperature for 2 hours, then cooled; the following solvent mixture was added:

| n-Butanol | 5.590 parts |
| Aromatic hydrocarbon (boiling range 160°–175° C.) | 3.723 parts |
| Butyl acetate | 4.627 parts |

The composition thus obtained had a total solids content of 45%; the content of insoluble gel microparticles was 25%.

(c) Preparation of Coating Composition

The following series of ingredients identified in columns I and II respectively were blended:

| | I | II |
|---|---|---|
| Butylated melamine-formaldehyde resin (67% solution in butanol) | 9.13 parts | 9.13 parts |
| Flow-promoting polymer (10% solution in xylene) | 0.37 part | 0.37 part |
| Thermosetting acrylic polymer (65% solution in xylene/butanol) | 34.92 parts | 44.81 parts |
| Modified microparticle dispersion from step (b) | 17.71 parts | — |
| Transparent iron oxide millbase (16% iron oxide) | 1.34 part | 1.34 part |
| Dispersion of aluminium flake (20% paste) | 8.73 parts | 8.73 parts |
| Isopropanol | 9.04 parts | 15.51 parts |
| Butyl acetate | 6.03 parts | 10.34 parts |
| Aliphatic hydrocarbon (boiling range 100°–120° C.) | 5.02 parts | 8.61 parts |

Paint compositions I and II were both thinned with xylene to a viscosity of 33 seconds at 25° C. when measured in a B.S. B3 cup. Two coats of each paint were applied wet-on-wet to primed metal panels, allowing a 1-minute flash-off period between coats. After a final 2-minute flash-off period, the panels were stoved at 127° C. for 30 minutes.

The control of the aluminium flake and resistance to sagging were observed to be superior in the case of the coating from composition I than in the case of that from composition II.

The thermosetting acrylic polymer used in the above-described compositions was a copolymer of styrene (30%), methyl methacrylate (15%), butyl methacrylate (17%), 2-ethylhexyl acrylate (20%), hydroxyethylacrylate (15%) and methacrylic acid (3%), the percentages being by weight. The polymer had a weight average molecular weight of 10,000–20,000.

EXAMPLE 2

(a) Preparation of Polymer Microparticles

To a vessel fitted as described in Example 1 was charged:

| Aliphatic hydrocarbon (boiling range 170°–210° C.; aromatic content 5%) | 10,000 parts |
| Heptane | 41.740 parts |

The vessel and contents were purged with inert gas and the temperature of the contents was raised to recycling temperature (100° C.). The following pre-mixed ingredients were then added:

| Methyl methacrylate | 1.940 parts |
| Azodiisobutyronitrile | 0.128 part |
| Methacrylic acid | 0.039 part |
| Graft copolymer stabiliser (33% solution as described in Example 1) | 2.785 parts |

The reactants were maintained at 100° C. for 30 minutes and then the following pre-mixed ingredients were fed into the hydrocarbon returning from the condenser at a uniform rate over a period of 3 hours:

| | |
|---|---|
| Ethyl acrylate | 17.969 parts |
| Glycidyl methacrylate | 0.748 part |
| Azodiisobutyronitrile | 0.122 part |

After completion of the feed, the reactants were held at recycle temperature for 1 hour; the following pre-mixed ingredients were then fed into the returning hydrocarbon at a uniform rate over a period of 3 hours:

| | |
|---|---|
| Ethyl acrylate | 17.961 parts |
| Methacrylic acid | 0.748 part |
| Azodiisobutyronitrile | 0.112 part |

When one-third of this final feed remained to be added (i.e. after about 2 hours of the feed), there was dissolved in the remaining feed 0.047 part of triethylenediamine, and the feed was then completed. After this, the reactants were held at recycle temperature for a further 4 hours to complete conversion.

The resulting polymer dispersion had a solids content of 39%; the content of insoluble microparticles in the dispersion was 28%.

(b) Modification of Microparticles with Auxiliary Polymer

To a vessel fitted as in step (a) there was charged:

| | |
|---|---|
| Microparticle dispersion obtained in step (a) | 41.108 parts |
| Aliphatic hydrocarbon (boiling range 115°–145° C.) | 12.288 parts |

This charge was heated to recycling temperature (110° C.) in an inert gas atmosphere. The following ingredients were pre-mixed and fed at a constant rate over a period of 3 hours to the hydrocarbon returning from the condenser.

| | |
|---|---|
| Methyl methacrylate | 5.938 parts |
| Hydroxyethyl acrylate | 3.386 parts |
| Methacrylic acid | 0.883 part |
| Butyl methacrylate | 6.560 parts |
| 2-Ethylhexyl acrylate | 6.774 parts |
| Styrene | 10.150 parts |
| tert-Butyl perbenzoate | 1.610 parts |
| prim-Octyl mercaptan | 0.502 part |
| Graft copolymer stabiliser solution (as used in step (a)) | 2.656 parts |

On completion of the feed, the reactants were held at recycling temperature for 2 hours and then cooled. The following solvent mixture was added:

| | |
|---|---|
| n-Butanol | 6.101 parts |
| Aromatic hydrocarbon (boiling range 160°–175° C.). | 4.063 parts |
| Butyl acetate | 5.049 parts |

The composition thus obtained had a total solids content of 50%; the content of insoluble gel microparticles was 16%.

(e) Preparation of Coating Composition

The following ingredients were blended:

| | |
|---|---|
| Butylated melamine-formaldehyde resin (67% solution in butanol) | 26.88 parts |
| Flow-promoting polymer (10% solution in xylene) | 1.11 parts |
| Thermosetting acrylic polymer (65% solution in xylene/butanol) (as described in Example 1) | 65.37 parts |
| Modified microparticle dispersion from step (b) | 87.56 parts |
| Transparent iron oxide millbase (16% iron oxide) | 3.96 parts |
| Dispersion of aluminium flake (20% paste) | 25.77 parts |
| Isopropanol | 26.10 parts |
| Methyl ethyl ketone | 17.4 parts |
| Aliphatic hydrocarbon (boiling range 100°–120° C.) | 14.5 parts |

The paint composition so obtained was thinned with xylene to a viscosity of 33 seconds at 25° C. when measured in a B.S. B3 cup. Two coats of the paint were applied wet-on-wet to a primed metal panel, allowing a 1-minute flash-off period between coats. After a final 2-minute flash-off period, the panel was stoved at 127° C. for 30 minutes.

The control of the aluminium flake and resistance to sagging were observed to be superior in the case of the coating from the composition than in the case of that from composition II of Example 1(c).

EXAMPLE 3

A. Preparation of Polymer Microparticles (a) Preparation of Amphipathic Copolymer Dispersant (i) A mixture of technical ricinoleic acid (2770 parts), toluene (455 parts) and methanesulphonic acid (5 parts) was heated under reflux at 180°–190° C., water of condensation being removed (190 parts) until the reaction mixture was found to have an acid value of 32.4 mg KOH/g (reaction time was about 6 hours). The solution of poly(ricinoleic acid) thus obtained had a solids content of 84.3%. $\overline{M}_n$ determined by end-group analysis was 1731 and by gel permeation chromatography 2400; $\overline{M}_w$ was 5150, hence $\overline{M}_w/\overline{M}_n = 2.14$.

(ii) A mixture of methyl ethyl ketone (1600 parts) and toluene (1600 parts) was heated to reflux temperature and to it was fed, over a period of 2 hours with continuous reflux, a mixture of methyl methacrylate (1920 parts), glycidyl methacrylate (195 parts), azobis-(isobutyronitrile) (29 parts) and primary-octyl mercaptan (29 parts). The reaction mixture was held at reflux temperature for a further 4 hours. 2-Ethoxyethyl acetate (1778 parts) was then added and the mixture distilled until a total of 3200 parts of distillate was removed. The product was a 55% solids solution of copolymer having $\overline{M}_w/\overline{M}_n = 3.83$).

(iii) The copolymer solution obtained in (ii) (2685 parts) along with 1655 parts of 2-ethoxyethyl acetate was heated to reflux temperature and a mixture of the solution of poly(ricinoleic acid) obtained in (i) (750 parts) and dimethyllaurylamine (2.5 parts) was added. Heating under reflux was continued for 14 hours; a further mixture of the poly(ricinoleic acid) solution (750 parts) and dimethyllaurylamine (2.5 parts) was then added and refluxing continued for 36 hours, a small further amount of dimethyllaurylamine being added after 72 hours. The reaction mixture became progressively clearer over the total heating period and continuous monitoring of its acid value showed that the latter fell to a final value of less than 1 mg KOH/g. Hydrocarbon of boiling range 180°–210° C. ("Isopar L") (3500 parts) was added, and the mixture distilled until about 2500 parts of distillate had been removed. The product was a 46% solids solution of a graft copolymer dispersant having an acrylic polymer backbone and pendant side-chains of poly(ricinoleic acid) residues.

(b) Preparation of Dispersion

A 6-liter reaction vessel was fitted with a turbine stirrer, inert gas inlet, a 12" steam-heated fractionating column and a Dean and Stark separator. To this vessel was charged hydrocarbon boiling range 180°–210° C. ("Isopar L") (600 g), the 46% dispersant solution obtained in (a) (291 g), phthalic anhydride (700 g) and titanium ethylene glycol complex (1 g). This charge was heated to reflux temperature with rapid stirring, causing the phthalic anhydride to melt and become emulsified in the hydrocarbon. There was then added a mixture of trimethylolpropane (191 g), tetraethylene glycol (103 g) and diethylene glycol (206 g), followed by a similar mixture in the same amounts added at an even rate over a period of 2 hours. At the beginning of this addition, the reaction mixture had the appearance of a very fine milk-like dispersion, with blue light scatter; at the end, the mixture was white and opaque but still a stable dispersion. An additional 48 g of dispersant solution was then added. Heating at reflux temperature was continued for 24 hours, with the removal of water and gradual fall of acid value to a final value of about 39 mg KOH/g. Diluent was then removed by distillation to give a 60.5% solids dispersion of particles of a cross-linked tetraethylene glycol/diethylene glycol/trimethylolpropane phthalate polyester in the molar proportions 0.11/0.41/0.3/1. The viscosity of the dispersion was about 4 poise and the polyester microparticles were found to be of size 0.5–4 microns (optical microscope) and to have a glass-rubber transition temperature of about 18° C.

(c) Modification of Microparticles with Auxiliary Polymer

To a vessel fitted as described in step (a) of Example 1 there was charged:

| | |
|---|---|
| Microparticle dispersion obtained in step (b) above | 41.350 parts |
| Aliphatic hydrocarbon (boiling range 115°–145° C.) | 22.500 parts |

This charge was heated to recycling temperature (115° C.) in an inert gas atmosphere. The following ingredients were pre-mixed and fed at a constant rate over a period of 3 hours to the hydrocarbon returning from the condenser:

| | |
|---|---|
| Methyl methacrylate | 3.342 parts |
| Hydroxyethyl acrylate | 1.906 parts |
| Methacrylic acid | 0.496 part |
| Butyl methacrylate | 3.691 parts |
| 2-Ethylhexyl acrylate | 3.812 parts |
| Styrene | 5.712 parts |
| tert-Butyl perbenzoate | 0.906 part |
| prim-Octyl mercaptan | 0.847 part |
| Graft copolymer stabiliser solution (as described in step (a) of Example 1) | 1.495 parts |

On completion of the feed, the reaction mixture was held at recycle temperature for 2 hours, then cooled; the following solvent mixture was added:

| | |
|---|---|
| n-Butanol | 5.590 parts |
| Aromatic hydrocarbon (boiling range 160°–175° C.) | 3.723 parts |
| Butyl acetate | 4.627 parts |

The composition thus obtained had a total solids content of 44% the content of insoluble gel microparticles was 20%.

(B) Preparation of Coating Composition

The following ingredients were blended:

| | |
|---|---|
| Butylated melamine-formaldehyde resin (67% solution in butanol) | 9.13 parts |
| Flow-promoting polymer (10% solution in xylene) | 0.38 part |
| Thermosetting acrylic polymer (65% solution in xylene/butanol (as described in Example 1) | 30.70 parts |
| Modified microparticle dispersion from step (b) | 20.09 parts |
| Transparent iron oxide millbase (16% iron oxide) | 1.34 parts |
| Dispersion of aluminium flake (20% paste) | 8.75 parts |
| Isopropanol | 7.36 parts |
| Butyl acetate | 4.90 parts |
| Aliphatic hydrocarbon (boiling range 100°–120° C.) | 4.08 parts |

The paint composition so obtained was thinned with xylene to a viscosity of 33 seconds at 25° C. when measured in a B.S. B3 cup. Two coats of the paint were applied wet-on-wet to a primed metal panel, allowing a 1-minute flash-off period between coats. After a final 2-minute flash-off period, the panel was stoved at 127° C. for 30 minutes.

The control of the aluminium flake and resistance to sagging were observed to be superior in the case of the coating from the composition than in the case of that from the composition II of Example 1(c).

EXAMPLE 4

Polyester "metallic" finish composition, with and without polymer microparticles (1) Preparation of Polymer Microparticles To a vessel fitted with stirrer, thermometer and reflux condenser the following were added:

| | |
|---|---|
| Aliphatic hydrocarbon (boiling range 140°–156° C.: zero aromatic content) | 20.016 parts |
| Methyl methacrylate | 1.776 parts |
| Methacrylic acid | 0.036 part |
| Azo-diisobutyronitrile | 0.140 part |
| Graft copolymer stabiliser (33% solution) (as described below) | 0.662 part |

The vessel and contents were purged with inert gas and the temperature then raised to 100° C. and held there for 1 hour in order to produce a disperse polymer "seed". The following ingredients were pre-mixed and were fed into the vessel at a uniform rate over a period of 6 hours, maintaining stirring and heating at 100° C.:

| | |
|---|---|
| Methyl methacrylate | 32.459 parts |
| Glycidyl methacrylate | 0.331 part |
| Methacrylic acid | 0.331 part |
| Azo-diisobutyronitrile | 0.203 part |
| Dimethylaminoethanol | 0.070 part |
| Graft copolymer stabiliser solution (as described below) | 6.810 parts |
| Aliphatic hydrocarbon (boiling range 140°–156° C.) | 33.166 parts |
| | 100.000 parts |

The contents of the vessel were held at 100° C. for a further 3 hours, to give full conversion of the monomers to a fine dispersion containing insoluble polymer gel microparticles (21–22% of the total dispersion) together with uncross-linked polymer particles (23% of the total dispersion).

The graft copolymer stabiliser used in the above procedure was obtained as follows. 12-Hydroxystearic acid was self-condensed to an acid value of about 31–34 mg KOH/g (corresponding to a molecular weight of 1650–1800) and then reacted with an equivalent amount of glycidyl methacrylate. The resulting unsaturated ester was copolymerised at a weight ratio of 2:1 with a mixture of methyl methacrylate and acrylic acid in the proportion of 95:5.

(2) Modification of Microparticles with Auxiliary Polymer

To a vessel fitted as described in step (a), there were charged 63.853 parts of the dispersion obtained in step (a) above. The dispersion was heated to 115° C. and the vessel was purged with inert gas. The following ingredients were premixed and were fed at a steady rate, over a period of 3 hours, to the stirred contents of the vessel, the temperature being maintained at 115° C.:

| | |
|---|---|
| Methyl methacrylate | 3.342 parts |
| Hydroxyethyl acrylate | 1.906 parts |
| Methacrylic acid | 0.496 part |
| Butyl Acrylate | 3.691 parts |
| 2-Ethylhexyl acrylate | 3.812 parts |
| Styrene | 5.712 parts |
| Azo-diisobutyronitrile | 0.906 part |
| Prim-octyl mercaptan | 0.847 part |
| Graft copolymer stabiliser solution (as described in step (a)) | 1.495 parts |

On completion of the addition, the contents of the vessel were held at 115° C. for a further 2 hours to achieve full conversion of the monomers, and 13.940 parts of butyl acetate were finally added, bringing the total charge to 100.000 parts. The dispersion so obtained had a total film-forming solids content of 45–46%; the content of insoluble gel polymer microparticles was 27.0–27.5%.

(3) Preparation of Coating Composition

The following series of ingredients, identified in columns I and II respectively, were blended:

| | I | II |
|---|---|---|
| Butylated melamine/formaldehyde resin (67% solids in butanol) | 39.3 parts | 39.3 parts |
| Dispersion of phthalocyanine Blue (9.7% in xylene) | 3.63 parts | 3.63 parts |
| Dispersion of phthalocyanine green-blue (8.65% in xylene) | 2.34 parts | 2.34 parts |
| Alkyd resin solution (as described below) | 59.83 parts | 117.6 parts |
| Butyl acetate | 20.1 parts | 20.1 parts |
| Methyl ethyl ketone | 20.1 parts | 20.1 parts |
| Flow-promoting polymer (10% solution in xylene) | 0.9 parts | 0.9 parts |
| Dipentene | 30.0 parts | 30.0 parts |
| Modified microparticle dispersion (as described in (2) above) | 77.31 parts | — — |
| Dispersion of aluminium flake (20% paste in xylene) | 18.15 parts | 18.14 parts |
| Xylene | — — | 20.0 parts |

The alkyd resin used in the above formulation was a 70% solids solution in a 4:1 by weight mixture of xylene and isobutanol of a 34% oil length resin made by condensing coconut oil, trimethylolpropane, glycerol and phthalic anhydride in the molar proportions 1.0:4.05:0.5:5.14 respectively.

Both compositions I and II had a viscosity of 33 secs. measured in B.S. B3 cup at 25° C.

Four coats of each composition were applied wet-on-wet to primed metal panels, allowing a 1-minute flash-off period between coats. After a final 10-minute flash-off period, the panels were stoved at 127° C. for 30 minutes.

The control of the aluminium flake pigment on application, as observed by absence of "shear" effects and "black-edging" in the coatings obtained, was found to be superior in the case of composition I to that in the case of composition II.

We claim:

1. A coating composition suitable for spray application to a substrate which comprises (A) a film-forming polymer, (B) a volatile organic liquid diluent in which the polymer (A) is carried; (C) polymer microparticles having a diameter of from 0.01 to 10 microns which are insoluble in the combination of the film-forming polymer (A) and the diluent (B) and are maintained in a substantially deflocculated, sterically stabilized state of dispersion therein as a consequence of their having been prepared by a method involving two essential stages, namely (i) the polymerization of monomer, from which the microparticles are to be derived, in an inert liquid in which the resulting polymer is insoluble and under conditions such that the polymer is obtained in a state of stable dispersion, and (ii) the subsequent polymerization, in the same inert liquid and in the presence of the microparticles formed in the first stage, of monomer giving rise to a second polymer which is compatible with the film-forming polymer (A) and soluble in the combination of polymer (A) and diluent (B), and (D) metallic pigmentation also dispersed in the combination of polymer (A) and diluent (B).

2. A composition as claimed in claim 1, wherein the film-forming polymer (A) is a polymer or copolymer of one or more alkyl esters of acrylic acid or methacrylic acid.

3. A composition as claimed in claim 1, wherein the microparticle polymer is an acrylic addition polymer.

4. A composition as claimed in claim 1, wherein the microparticle polymer is a condensation polymer.

5. A composition as claimed in claim 1, wherein the polymer microparticles have been produced by a process of dispersion polymerisation of monomers in an organic liquid, in which the resulting polymer is insoluble, in the presence of an amphipathic steric stabilising agent.

6. A composition as claimed in claim 5, wherein the amphipathic steric stabilising agent is a block or graft copolymer the molecule of which contains one component consisting of polymer chains which are solvatable by the organic liquid and another component consisting of polymer chains of different polarity which are not solvatable by the organic liquid and are capable of becoming anchored to the polymer microparticles.

7. A composition as claimed in claim 6, wherein the stabilising agent is a graft copolymer comprising a polymer backbone which is not solvatable by the organic liquid and a plurality of polymer chains pendant from the backbone which are solvatable by the organic liquid.

8. A composition as claimed in claim 1, wherein the polymer microparticles (C) are present in an amount of from 2% to 30% of the aggregate weight of the film-forming polymer (A) and the microparticles.

9. A composition as claimed in claim 1, wherein the metallic pigmentation (D) is of aluminium.

10. A composition as claimed in claim 1, wherein the metallic pigment amounts to from 1% to 10% of the aggregate weight of the film-forming material (A) and the microparticles (C).

* * * * *